(12) United States Patent
Roschelle et al.

(10) Patent No.: US 10,403,163 B2
(45) Date of Patent: Sep. 3, 2019

(54) METHOD AND SYSTEM FOR PROVIDING COLLABORATIVE LEARNING

(75) Inventors: Jeremy Roschelle, Palo Alto, CA (US); Sarah Zaner, Lafayette, CA (US); Charles M. Patton, Eugene, OR (US)

(73) Assignee: SRI International, Menlo Park, CA (US)

( * ) Notice: Subject to any disclaimer, the term of this patent is extended or adjusted under 35 U.S.C. 154(b) by 479 days.

(21) Appl. No.: 13/477,952

(22) Filed: May 22, 2012

(65) Prior Publication Data

US 2013/0316323 A1    Nov. 28, 2013

(51) Int. Cl.
*G09B 7/00* (2006.01)

(52) U.S. Cl.
CPC ...................... *G09B 7/00* (2013.01)

(58) Field of Classification Search
CPC ... G09B 5/00; G09B 7/00; G09B 5/14; G09B 5/08; G09B 19/00
USPC .......................................... 434/322, 323, 350
See application file for complete search history.

(56) References Cited

U.S. PATENT DOCUMENTS

| | | | |
|---|---|---|---|
| 5,537,141 A * | 7/1996 | Harper et al. | 725/116 |
| 6,895,213 B1 | 5/2005 | Ward | |
| 9,361,807 B2 | 6/2016 | Roschelle et al. | |
| 2002/0106615 A1 | 8/2002 | Murray et al. | |
| 2002/0160347 A1 * | 10/2002 | Wallace et al. | 434/322 |
| 2003/0180703 A1 * | 9/2003 | Yates | G09B 7/00 434/353 |
| 2004/0063085 A1 * | 4/2004 | Ivanir et al. | 434/322 |
| 2006/0183100 A1 | 8/2006 | Voehl et al. | |
| 2007/0009871 A1 | 1/2007 | Tidwell-Scheuring et al. | |
| 2008/0014569 A1 * | 1/2008 | Holiday | G09B 3/00 434/351 |
| 2011/0177483 A1 * | 7/2011 | Needham et al. | 434/322 |

OTHER PUBLICATIONS

Roschelle et al., "Scaffolding group explanation and feedback with handheld technology: impact on students' mathematics learning," Education Tech Research, Oct. 22, 2009, 21 pp.
Roschelle et al., "From handheld collaborative tool to effective classroom module: Embedding CSCL in a broader design framework," Elsevier, Apr. 21, 2010, 10 pp.
Prosecution History from U.S. Appl. No. 13/477,938, dated Mar. 25, 2014 through May 10, 2016, 94 pp.

* cited by examiner

*Primary Examiner* — Jerry-Daryl Fletcher
(74) *Attorney, Agent, or Firm* — Shumaker & Sieffert, P.A.

(57) ABSTRACT

The present disclosure relates to methods and systems for providing collaborative learning. In one embodiment, a method includes presenting a first task to a plurality of users on a shared display and receiving inputs via respective input devices for collectively solving the task. The received inputs are analyzed to determine whether the task is correctly performed and to infer one or more probabilistic conclusions about a level of comprehension associated with the first task. An output is presented based upon the probabilistic conclusions about the level of comprehension.

18 Claims, 11 Drawing Sheets

300
1. A ROCKETSHIP TRAVELS AT 1000 M/S FOR 30 SECONDS, THEN SLOWS AT 50 M/S² FOR 10 SECONDS, THEN TRAVELS FOR 30 SECONDS AT THE EXISTING SPEED AT THE END OF THE SLOWING PERIOD.
MATCH THE GRAPH TO THE ABOVE DESCRIPTION →
2. 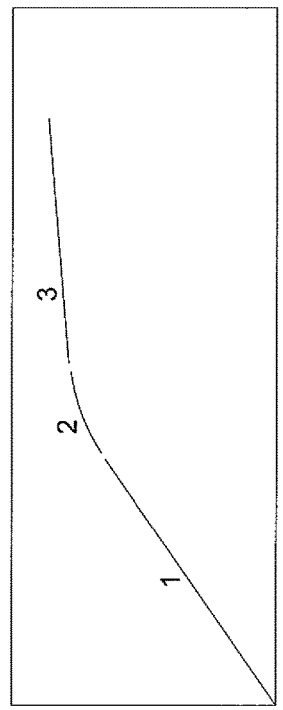
CORRECT? →
3. 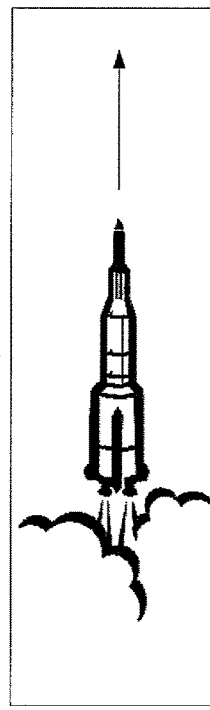
FIG. 3

US 10,403,163 B2

METHOD AND SYSTEM FOR PROVIDING COLLABORATIVE LEARNING

CROSS REFERENCE TO RELATED APPLICATIONS

This application is related to U.S. patent application Ser. No. 13/477,938 entitled "METHOD AND APPARATUS FOR PROVIDING COLLABORATIVE LEARNING", filed May 22, 2012, which is herein incorporated by reference in its entirety.

FIELD OF THE DISCLOSURE

The present disclosure relates to technology driven classroom learning.

BACKGROUND OF THE DISCLOSURE

Collaborative learning is a powerful technique for improving students' comprehension of complex subject matters, but collaborative learning is difficult for instructors to organize and implement in the classroom. Paper-based collaborative learning programs do exist, but these do not give students automatic feedback, do not keep extensive records across many data points and it is burdensome for teachers to implement. Computer-based classroom learning is used for a variety of instructional activities. However, most commercial products that aim to improve student learning take a highly individualistic approach. Thus, conventional desktop computers are inadequate for truly supporting student collaboration because it is hard for multiple students to be equally involved and active with the desktop computer. Similarly, when each student has his or her own laptop, the students tend not to collaborate.

SUMMARY OF THE DISCLOSURE

The present disclosure relates to systems and methods for collaborative learning. In one embodiment, a system comprises a server and activity stations connected to the server, the activity stations each including a shared display, input devices, a processor and a computer-readable medium. The computer-readable medium includes instructions which, when executed by the processor, cause the processor to perform a method including: presenting a collaborative task to the shared display, receiving inputs from the input devices associated with different users for solving the task, collecting data associated with the inputs and transmitting the data to a server for determining a level of comprehension of the task. The server is configured to download a selected sequence of one or more subsequent tasks to each of the activity stations based at least partly on the determined level of comprehension.

Another embodiment involves a method for providing collaborative learning. For example, the method may include presenting a first task to a plurality of users on a shared display and receiving inputs via respective input devices for collectively solving the task. The received inputs are analyzed to determine whether the task is correctly performed and to infer one or more probabilistic conclusions about a level of comprehension associated with the first task. An output is presented based upon the probabilistic conclusions about the level of comprehension.

In still another embodiment, a method includes presenting a task to users on a shared display and receiving inputs from input devices associated with the respective users for collectively solving the task. The method further provides a private feedback to a selected user based on the input received from the input device associated with the selected user.

BRIEF DESCRIPTION OF THE DRAWINGS

The teachings of the present disclosure can be readily understood by considering the following detailed description in conjunction with the accompanying drawings, in which:

FIG. 3 illustrates an exemplary collaborative learning activity, according to the present disclosure;

To facilitate understanding, identical reference numerals have been used, where possible, to designate identical elements that are common to the figures.

DETAILED DESCRIPTION

The present disclosure relates to systems and methods for providing collaborative learning. In particular, collaborative learning techniques are used to improve students' comprehension of complex subject matters. Successful collaborative learning exercises incorporate two properties: individual accountability and group interdependence. Yet it is difficult for teachers to organize comprehension activities that have these two key properties. A shared computer can organize activities that have these properties, but computers typically only have one input device. Thus, it is difficult for multiple students to be equally involved and active with the desktop computer. The use of laptop computers has its own deficiencies in encouraging student collaboration. In particular, when each student has his or her own laptop, the students tend not to collaborate. In addition, paper-based collaborative learning programs do exist, but these do not give students automatic feedback, do not keep extensive records across many data points and it is burdensome for teachers to implement.

In one embodiment, the present disclosure facilitates collaboration by providing two or more students with individual input devices that interface to a single shared display or monitor. Such individual input devices will tend to encourage collaboration as will be described below. For instance, if a single student is allowed to access all of the input areas on a single shared touch screen display, then the one student may take over the entire activity, thereby discouraging the collaboration by a group of students. Thus, in embodiments of the present disclosure each student has an input device that only he or she can use. Thus, there is individual accountability. An exemplary input device according to embodiments of the present disclosure may be low cost, robust (hard to break), and may include a mix of keys (for discrete input, or input of numbers or symbols), gestures (for indicating directions), and continuously variable inputs (e.g., to indicate a magnitude) and so on.

Group interdependence is achieved by integrating or juxtaposing each student input onto a shared display. Specifically, collaborative learning is enhanced if students focus not on their individual surfaces but rather on a shared display. In one embodiment, the shared display may comprise a display of a laptop or a desktop computer that the three or more students can see. In another embodiment, the shared display may comprise a pico projector displaying on a surface (e.g., a wall, a tabletop, a portable white board, etc.). In various other embodiments, the display may take any number of forms such as a standard television, a tablet screen/display, or other known visual displays.

Figure 1:
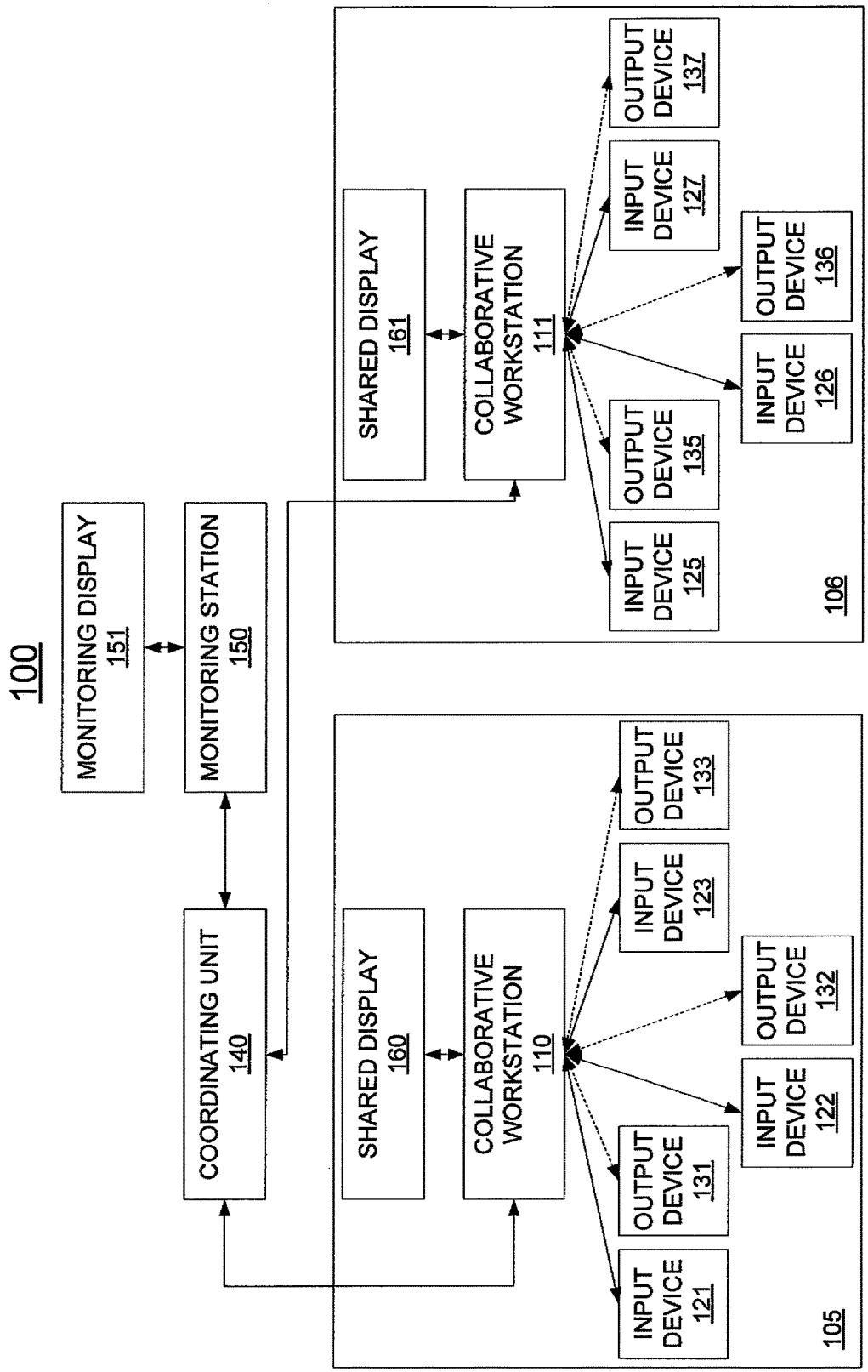
FIG. 1 is a schematic diagram illustrating one embodiment of a system for providing collaborative learning, according to the present disclosure.

FIG. 1 is a schematic diagram illustrating one embodiment of a collaborative learning system 100, according to the present disclosure. In one embodiment, the collaborative learning system 100 includes one or more activity stations comprising a collaborative workstation, a shared display and a plurality of input devices. For example, one activity station 105 may comprise collaborative workstation 110, shared display 160 and input devices 121, 122 and 123. Another activity station 106 may comprise collaborative workstation 111, shared display 161 and input devices 125, 126 and 127. Although only two activity stations 105 and 106 are shown in FIG. 1, it should be understood that numerous other activity stations may be interconnected to centralized components, thereby providing activity stations to all students in a classroom and enabling an instructor or other individuals and systems to monitor the students' collaboration and progress. Thus, in the system 100 of FIG. 1 two activity stations are shown for simplicity and ease of understanding only. In any case, each activity station 105 and 106 may be for a group of three or more students/users to engage in a collaborative task or learning activity. In addition, each of the activity stations may be connected to one or more centralized components such as a coordinating unit 140 (e.g., a server), a monitoring station 150 and/or a monitoring display 151 (e.g., for use by an instructor/teacher in monitoring the learning of individuals, groups or an entire classroom of students).

Figure 9:
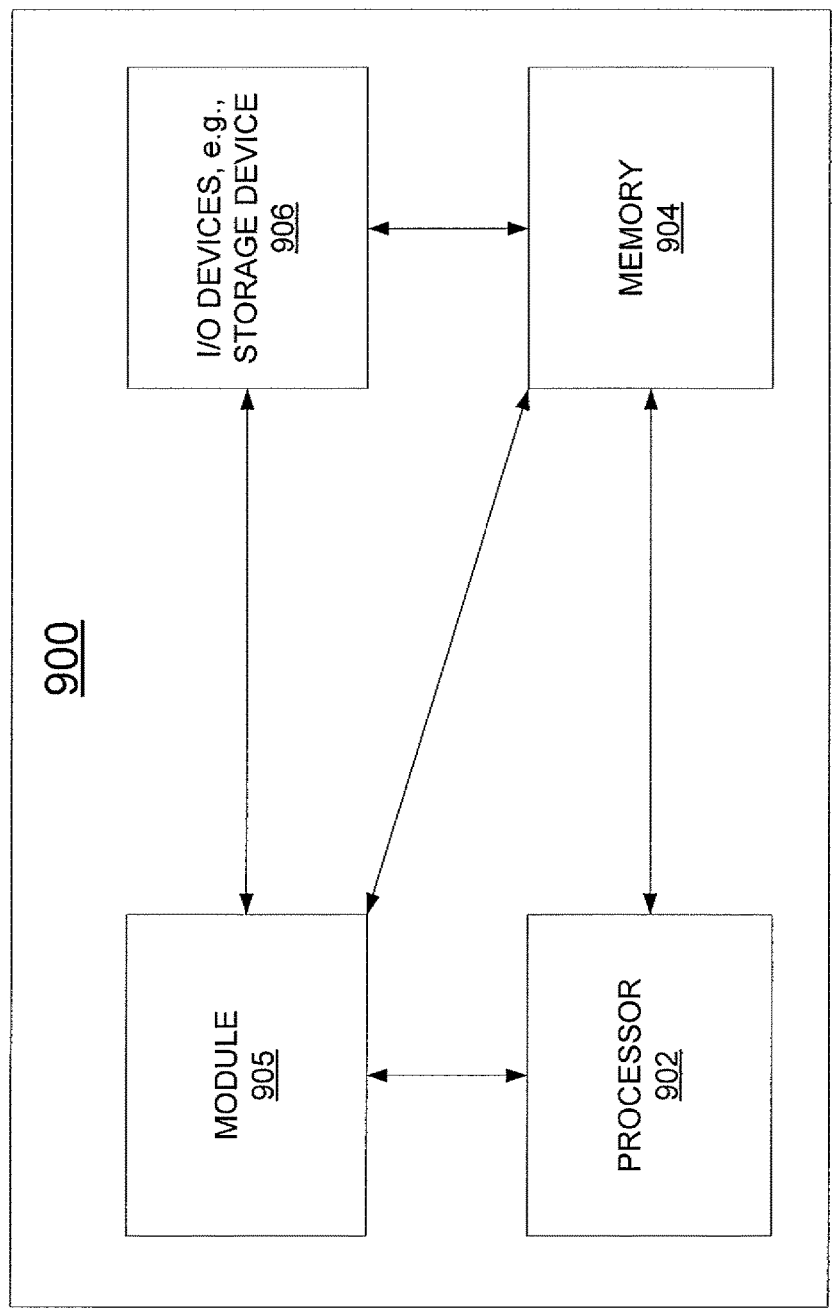
FIG. 9 is a high level block diagram of the present disclosure implemented using a general purpose computing device.

In one embodiment, each of the collaborative workstations 110 and 111 comprises a standalone computer (e.g., in the form of general purpose computing device 900 of FIG. 9) or other device that is capable of receiving inputs from one or more input devices, causing various collaborative activities to be displayed on a display, and sending and receiving task/activity information, feedback and monitoring data to and from the centralized components. In one embodiment, each of the collaborative workstations 110 and 111 comprises a laptop computer, tablet, desktop computer or like device with a screen comprising shared display 160 or 161 respectively. In one embodiment, each of the collaborative workstations and/or shared displays comprises a pica projector, which is a compact tabletop projector capable of presenting high resolution displays on surfaces such as a wall, a table top, a portable white board, etc. In particular, in one embodiment, a pico projector includes all of the capabilities of an exemplary collaborative workstation and shared display, as described herein.

In one embodiment, the input devices 121-123 and 125-127 each comprises a touchpad which permits a user to scroll, drag, select, click and to perform various other functions of a typical touchpad. In another embodiment, each of the input devices comprises a keypad or keyboard. In still another embodiment, each of the input devices comprises a tactile feedback device. Thus, in such case, each of the input devices may also present various "outputs" to the associated user in the form of tactile feedback. In one embodiment, each of the input devices is uniquely associated with a different user.

In one embodiment, each of the activity stations also comprises a plurality of output devices. For example, in activity station 105, each of the output devices 131, 132 and 133 is associated with a respective input device (e.g., 121-123) and an associated user/student. Similarly, in activity station 106, each of the output devices 135-137 is associated with a respective input device 125-127 and an associated student. In one embodiment, each of the output devices comprises a headset. In another embodiment, each of the output devices comprises an audio speaker, an individual display (e.g., on a personal device, such as a cell phone, 802.11 wireless device, laptop computer, and the like), or other such devices for contacting an individual user, without alerting or notifying other users in the same group. In still another embodiment, each of the output devices is integral with an associated input device. For example, input device 121 and output device 131 may in fact be one single tactile feedback device. Similarly, another single tactile feedback device may comprise both input device 125 and output device 135. In any case, each of the output devices 131-133 and 135-137 may be used to provide private feedback to different users, as described in greater detail below.

In one embodiment, the monitoring station 150 comprises a desktop, tablet or a laptop computer useable by an instructor or teacher for monitoring various groups of users/students at various activity stations. Thus, in one embodiment, the monitoring display 151 comprises a monitor of a desktop or laptop computer, depending upon the particular device used for the monitoring station 150. In one embodiment, coordinating unit 140 may be integrated with the monitoring station 150. For example, the coordinating unit 140 and monitoring station 150 may comprise a single computer (e.g., a teacher/instructor computer that is connected to each of a plurality of activity stations 105 and 106). However, in another embodiment, coordinating unit 140 may comprise a separate computer (e.g., a server). For example, coordinating unit 140 may comprise a server located within a classroom, or may be centralized within a school. Thus, coordinating unit 140 may serve a number of different classrooms and be connected to various monitoring stations (such as monitoring station 150) and various activity stations (such as activity stations 105 and 106) in different classrooms. In one embodiment, coordinating unit 140, monitoring station 150, activity stations 105 and 106 are interconnected by a local area network (LAN), wireless local area network (WLAN), a cellular data network, a wide area network (WAN), an enterprise or campus network or metropolitan network. Thus, in one embodiment, coordinating unit 140 may be located "in the cloud," and may be hosted by a telecommunications network provider or a third party provider connected to the internet.

A centralized arrangement, where the coordinating unit 140 interfaces with many different activity stations and monitoring computers, enables the collection of data regarding a large number of collaborative tasks/learning activities. Such collected data may then be used to evaluate students, groups of students, and the activities themselves. For example, a collaborative task designed to teach a particular mathematical concept to $7^{th}$ grade students may prove to be unexpectedly difficult. For example, coordinating unit 140 may collect data from many activity stations and/or many monitoring computers and determine that on average, it takes more than 10 minutes for a group of three $7^{th}$ grade students to successfully complete the activity/task. Based on the design, the average expected time to complete the activity/task may be 5 minutes. Thus, the activity/task may be mis-designed or may be inappropriate for that particular grade/skill level. This information might not be made apparent to a system designer where a coordinating unit is only interfaced to activity stations in a single classroom.

The above system 100 is described to provide an illustrative environment in which collaborative learning activities may be presented to and completed by groups of students (e.g., in a classroom). Thus, the current disclosure discloses methods and systems for providing collaborative learning in an exemplary computing system, such as illustrated in FIG. 1 and as described above.

Figure 10:
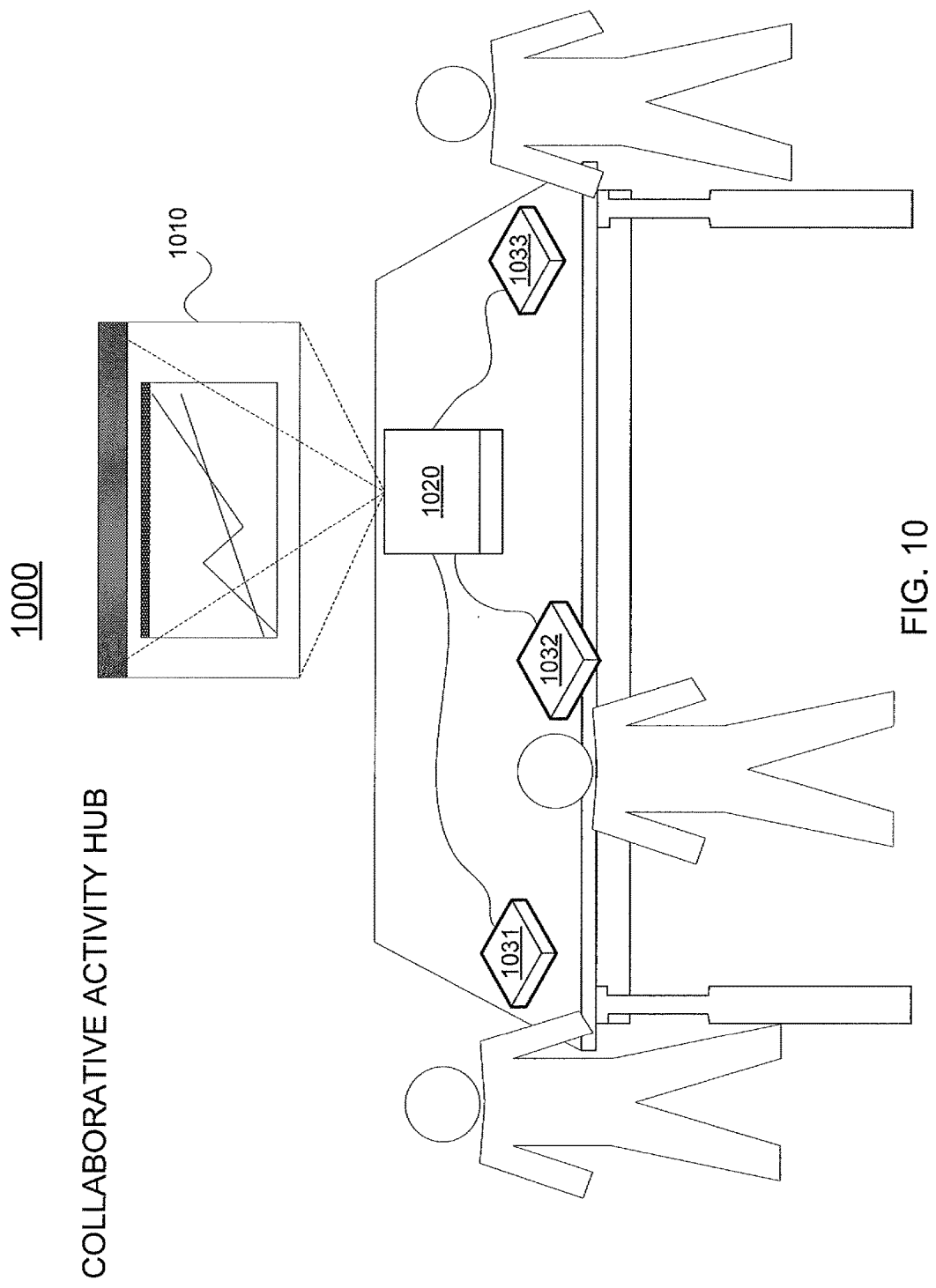
FIG. 10 is a representation of an exemplary collaborative activity station, in accordance with embodiments of the present disclosure.

FIG. 10 illustrates an exemplary collaborative activity station 1000 in accordance with embodiments of the present disclosure. In particular, FIG. 10 illustrates how a collaborative activity station may be deployed in a classroom for use by a group of three students. Each of the three students has a respective input device or pad 1031-1033. Each of the input pads 1031-1033 is connected to a collaborative workstation 1020. In one embodiment, the collaborative workstation 1020 comprises a projector (e.g., a pico projector) for creating a shared display 1010 for projection on a wall, a table, a portable white board, or other surfaces. As shown in FIG. 10, the shared display 1010 shows a collaborative learning activity where a runner and various marked distances are depicted on the top of the display. In addition, a plot of the runner's position versus time is shown below. For example, each of the input devices 1031-1033 may control a respective portion of the graph which the students must match to the runner's position shown above on the shared display 1010. The use of such an exemplary collaborative learning activity station for various collaborative learning activities is further described below in connection with the following FIGS. 2-8.

Figure 2:
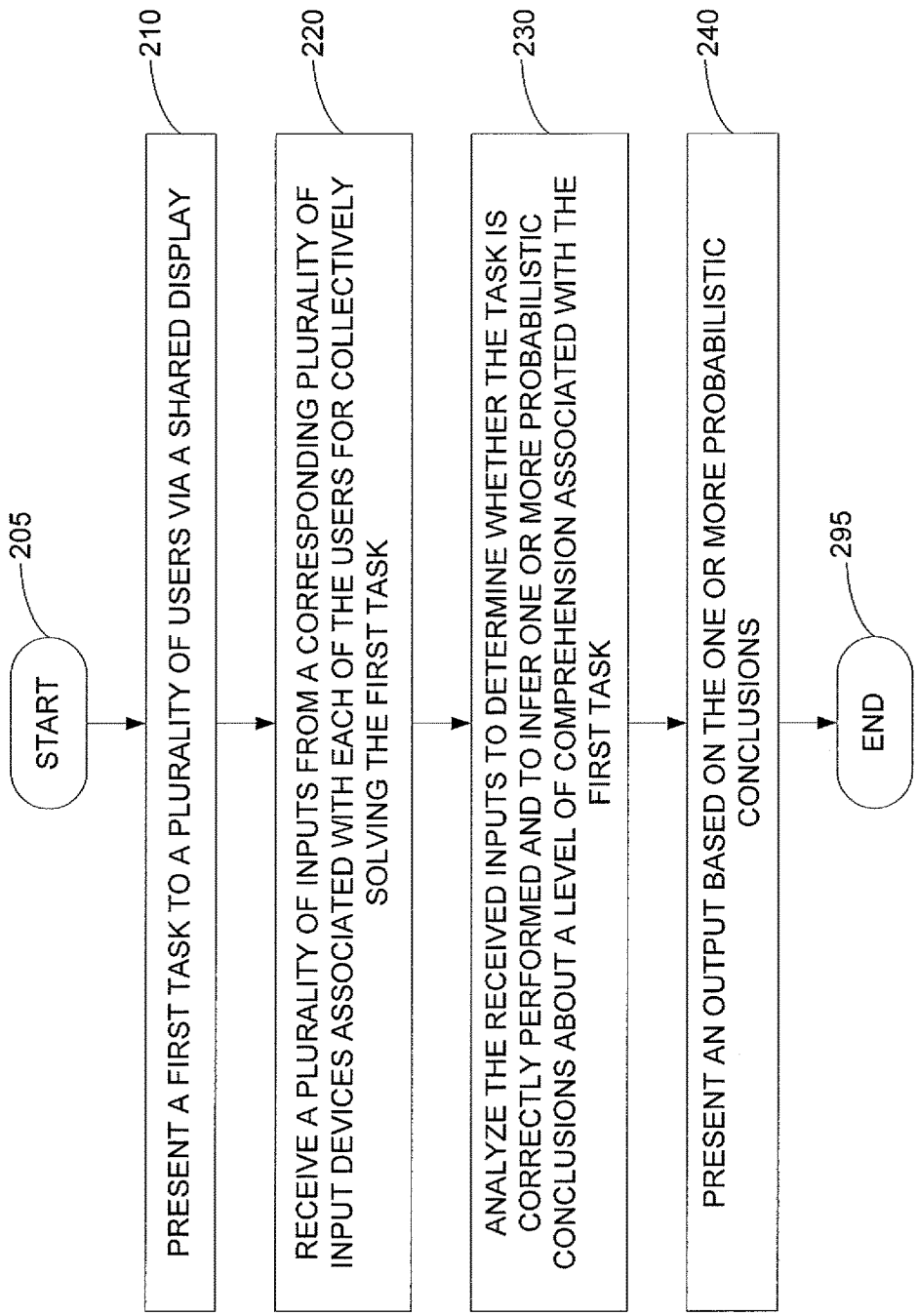
FIG. 2 is a flow diagram illustrating one embodiment of a method for providing collaborative learning, according to the present disclosure.

FIG. 2 is a flow diagram illustrating one embodiment of a method 200 for providing collaborative learning, according to the present disclosure. The method 200 may be implemented, for example, by a collaborative workstation (such as either of the collaborative workstations 110 or 111 as illustrated in FIG. 1). As such, reference may be made in the discussion of the method 200 to the collaborative workstation 110 or 111, as well as other components of the collaborative learning system 100. However, the method 200 is not limited to the implementation by a collaborative workstation configured in accordance with FIG. 1 and may, in fact, be implemented by a collaborative workstation having alternative configurations and components. For example, the method may be performed by the general purpose computer illustrated in FIG. 9, specifically programmed to perform steps of the method 200 (e.g., instructions stored or loaded in memory and executed by a processor). Similarly, any one or more of the steps of the method 200 may be performed by other components depicted and described in the system 100 of FIG. 1. For example, one or more of the steps of the method 200 may in fact be performed by the coordinating unit 140, monitoring station 150, and any one or more of the input devices 121-123 or 125-127, output devices 131-133 or 135-137, shared displays 160 or 161, or monitoring display 151.

The method 200 is initialized at step 205 and proceeds to step 210, where the method presents a first task to a plurality of users via a shared display. For example, a teacher or instructor may be teaching mathematical concepts and wish to supplement traditional classroom instructions with interactive collaborative learning activities. The teacher may have access to a collaborative learning system, such as system 100 in FIG. 1 for this purpose. More specifically, the teacher may have access to a monitoring station with a display for purposes of administering various collaborative learning activities to various groups of students. For example, the teacher may organize students in a number of groups (e.g., groups of three students each), each of the groups being given an activity station. Each of the activity stations may comprise a collaborative workstation, a shared display for collective use by the group, plus individual input devices, one input device assigned to each of the students in the group. In one embodiment, the monitoring station may direct the coordinating unit to download one or more tasks (e.g., tasks related to mathematical concepts that are currently being taught), or a sequence of tasks to each of the activity stations for each of the student groups.

In general, each task may comprise a collaborative learning activity for which a successful completion of the task requires a correct response that is collectively dependent upon inputs received from all of the students/users in the group. Broadly, a task/collaborative learning activity as described herein may refer to an instruction, a question or a command (e.g., relating to an educational teaching). In one embodiment, each task may be presented in a particular modality or form that represents an educational concept or idea, along with an instruction, question or command for completing the task. For example, an educational concept may comprise the math/physics/mechanics concept of "constant acceleration" (e.g., gravity). Thus, a task may comprise a video of a falling apple along with questions about the video, instructions to complete a graph about the video, and the like. Thus, the same educational concept (e.g., "constant acceleration") may be represented in a number of different modalities or other forms such as video, text, graph, equation, map, chart, and the like, as described in greater detail below. In one embodiment, the completion of a task may require one or more answers, or inputs, in a form or modality that is different from the form/modality in which the task is first presented. For instance, the task may be presented in the form of a video, and the instructions direct students to complete a cloze paragraph based on the video. In this case, the inputs will comprise text inputs (e.g., words to fill in the blanks). The following discussion elaborates further through several specific examples.

As mentioned above, a monitoring station may direct the coordinating unit to download a selected sequence of one or more tasks to each of the collaborative workstations for each of the student groups. In one embodiment, the same task or sequence of tasks may be provided to each of the groups. Alternatively, different tasks can be provided to different groups, e.g., randomly, based upon a level of advancement of students in the group, based upon a previous day's progress, and the like. In one embodiment, a teacher may select one or more tasks manually for downloading to each group. For example, the teacher may select one or more tasks, from a group of predesigned tasks relating to a particular concept or subject, via a monitoring computer. Alternatively, a coordinating unit or monitoring computer may select one or more tasks automatically for each group, e.g., based on the learning level of the current group. For example, the one or more tasks selected for each group may be selected randomly, from a pool of available predesigned tasks relating to a particular subject/concept, a particular skill level, the particular students placed into each group, data regarding students' and/or groups' completion of prior tasks, and other parameters.

Regardless of the manner in which a task or sequence of tasks is created or selected, at step 210 the method presents the first task to a group of users on a shared display. For instance, collaborative workstation 110 of activity station 105 may receive a sequence of tasks (e.g., collaborative learning activities) from a coordinating unit and display the first task in the list on an attached shared display. Notably, the shared display is visible to and shared by each of the users at a particular activity station (that is, in a particular group). The task may be presented in any number of modalities such as a text, graph, equation or animation/video, as will be described in greater detail below. For example, FIG. 3 illustrates the display of an exemplary collaborative learning activity, or task, according to the present disclosure. In particular, FIG. 3 box 1 shows an example of a task presented in a textual modality. This may represent what is displayed on a screen, or a portion of a screen on a shared display at step 210.

In step 220, the method 200 receives a plurality of inputs from a corresponding plurality of input devices associated with each of the users for collectively solving the first task. For example, as shown in FIG. 3 box 2, the successful completion of the task may require that each of three users manipulate the slope, length, placement or other parameters of a single line segment in a graph. In the example shown in FIG. 3, and in various other embodiments, the modality of the inputs (e.g., in graph form) can be different from the modality in which the task is initially presented (e.g., a textual modality). This requires students to conceptualize across and between different modalities in a process known as "transcoding." Transcoding processes are particularly important in learning and solidifying deep understanding of mathematical concepts. Thus, transcoding is discussed in further detail below in connection with various figures, methods and other embodiments.

Returning to the example task as shown in FIG. 3, a correct solution requires the correct placement and alignment of three line segments representing the three different time periods described in the text. Each of the users may have the ability, via an individual input device, such as a touchpad, to control aspects of only one of three available line segments. If any of the three segments is incorrect, the task will not be successfully completed. For interdependence, it may be desirable that tasks be structured so that one or more of the responses of one or more of the users can preclude one or more of the other users from responding correctly or constrain what constitutes a correct response by other users. In the current example, this can only be accomplished by giving each user control of only one endpoint, or only one of three available line segments. As another example, a task may call for users to fill in the blanks of the statement "If the slope of a line is {choice 1: negative, positive}, then the line slants {choice 2: up, down} as it moves to the right." No single choice is wrong by itself, but the "correct" answer for each choice depends on what is selected for the other choice by the other user. A task construction method is disclosed subsequently through which this desirable property can be obtained more generally. However, the students in the group may not be told which of the segments are correctly placed, and which are incorrectly placed. In one embodiment, the method may simply provide general hints such as indicating how many of the received inputs are correct, e.g., none out of the three inputs are correct, one out of the three inputs are correct and so on, without specifying which input is correct. Thus, to change the inputs to give a correct solution may require that the three students interact to assist one another in determining whose input is incorrect. In one embodiment, while these interactions, or a collaborative process between the students take place, the method 200 may display (e.g., continuously) the plurality of inputs received from the plurality of input devices associated with each of the students/users (e.g., FIG. 3, box 2). In one embodiment, the visual representation of the task (e.g., box 1) remains displayed simultaneously with the display of the plurality of inputs received (e.g., box 2).

In step 230, the method 200 analyzes the received inputs and/or data associated with the received inputs to determine whether the task is correctly performed and to infer one or more probabilistic conclusions about a level of comprehension associated with the first task. In particular, embodiments of the present disclosure seek to elicit data and information that is indicative of a level of comprehension, a level of understanding and/or a level of cooperation among the different students/users in a group (in addition to determining that the answers are "correct" and that the task is successfully completed). In this regard, it should be noted that embodiments of the present disclosure are generally not directed to declarative tasks (such as recalling names and dates, e.g., "who was the fourth president," or "when was the Declaration of Independence signed?").

In some embodiments, each student will have a limited number of available choices (e.g., selectable via a tumbler as presented on the shared display) to select as his or her input to solve a particular task/collaborative learning activity. Thus, the input choices available to each of the students may be analogous to a standard multiple choice question. Of course, the correct solution to a collaborative learning activity requires a correct solution that is dependent upon each of the students in a group providing the correct inputs, or inputs which, when taken together, result in a correct solution. For example, the first task presented may require a correct solution to: _____Y=_____X+_____. The input device of the first student may be able to control the input to the first blank, the input device of the second student may be able to control the input to the second blank, and the input device of the third student may be able to control the input to the third blank. Note that $Y=5X+10$ may be a correct solution to the task, whereas $2Y=10X+20$ and $3Y=15X+30$ are equally correct solutions. Consider if the inputs received result in a collective "answer" of $1Y=10X+20$. Note that first student is not necessarily incorrect. However, the first student's input is not compatible with those inputs received from the other two students. If the students discuss the matter and collectively determine that the first student should change his input to 2, then the group can change their "answer" to $2Y=10X+20$, which is now a correct solution to the task. On the other hand, the group could determine that the second and third students should change their inputs to 5 and 10 respectively, resulting in the collective "answer" changing to $Y=5X+10$, which is also a correct solution. In other words, a correct answer/solution to a task, or collaborative learning activity, is collectively dependent upon the inputs of all of the students. The foregoing example illustrates this principle in the context of manipulating an equation. However, in various other, further and different embodiments, students may be required to collectively manipulate an animation or video, perform doze activities (e.g., fill-in-the blanks in a text passage, selecting the appropriate missing portions in a video, i.e., a "video doze", selecting appropriate missing portions of a graph, i.e., a "graph doze", selecting appropriate missing portions of a table, i.e., a "table doze", or selecting appropriate missing portions of each of these in a multi-modal task, i.e., a "multi-media doze"), or constructing a graph, equation or table. Nevertheless, in each instance a task/collaborative learning activity requires a correct solution that is collectively dependent upon each of the inputs of the students within a group in order to successfully complete the task, or provide a correct solution to the task.

In one embodiment, at step 230 the method 200 may also collects data that is indicative of the manner in which the inputs are received or the manner in which the first task is completed. The data that is indicative of a manner in which the inputs are received and the data that is indicative of the manner in which the first task is completed may comprise data associated with the received inputs that pertains to things other than the "correctness" of the inputs in solving the task. For example, the data that is indicative of a manner in which the inputs are received may include information on how long it takes to provide an input, how many times an input is changed prior to finalizing the input, which of the students provides the input first, second, third, etc. (order of inputs), whether an incorrect input (or set of inputs) comprises a known distracter, and other such information. The data collected may also include data that is not necessarily derived directly from the inputs via the input devices. For example, the method 200 may, at step 230, also collect data that is more broadly indicative of the manner in which the first task is completed, for example: the amount of time one of the users spends talking relative to the other users (e.g., based upon analysis of an audio recording of the students in a group at the activity station, such as captured by a microphone or other audio recording device that is part of the activity station), the amount of time spent gazing at the shared display, or the amount of time the users spend facing one another (e.g., based upon one or more videos, such as captured by one or more webcams with facial recognition that are part of the activity station), whether and how closely a correct solution follows the providing of a hint, the number of times a user asks for help, the force with which a student presses his or her input device, a key or button on the input device, and other such information.

Some of these data points are indicative of a level of comprehension of a student or group of students. For example, students can guess correct answers or can become skilled at a repetitive task, but not truly understand the concept. One student can present a random input and a collective correct answer can still be crafted by the other two students in a group manipulating their inputs appropriately. Thus, in many cases the data collected at step 230 provides a teacher or other person with insights beyond merely whether the inputs are correct or whether the task was successfully completed. Accordingly, in one embodiment at step 230, the method analyzes the collected data to infer one or more probabilistic conclusions about a level of comprehension of one or more of the students in a group. It should be noted that in the context of the present disclosure, a probabilistic conclusion refers to a conclusion based upon collected data that is more or less likely to be true based upon the value of the data. For instance, if a data value is above a threshold, then the conclusion is more likely to be true, and if the data value is below the threshold, it is less likely to be true (or the opposite is true). For example, if the collected data indicates that a student or a group of students provided correct inputs in a faster than average time, the method 200 may, based upon this data, infer that the students probably or likely have a higher than average level of comprehension of the subject matter of the first task. Similarly, if the students changed their inputs several times before finally achieving a correct solution to the first task, the method 200 may infer that the students probably or likely have a lower than average level of comprehension of the subject matter. Based upon probabilistic conclusions of this nature, the method 200 may then take further action at step 240, as described below. The above example is only illustrative and should not be interpreted as a limitation.

In addition, some of these data points are also indicative of a level of collaboration of one or more of the students. Accordingly, in one embodiment at step 230, the method analyzes the collected data to infer one or more probabilistic conclusions about a level of collaboration of one or more of the students in a group. For example, if the data shows that one of the students spending an inordinate amount of time talking relative to the other users (e.g., based upon analysis of an audio recording of the students in a group at the activity station, such as captured by a microphone or other audio recording device that is part of the activity station), this may be indicative of a low level of collaboration, i.e., one student is interpreted as simply running the group and providing all of the answers. As such, at step 230, the method may infer that there is probably or likely a low level of collaboration among the students in the group. In another embodiment, if the data shows that all three students of the group spend a substantially equal amount of time talking to each other, this may be indicative of a high level of collaboration. The above example is only illustrative and should not be interpreted as a limitation. Other examples of probabilistic conclusions that the method may determine at step 230 are described below.

In many instances, the choice of inputs available to a student may include what is known as a distracter, which is an incorrect answer planted in a set of possible answers to a multiple choice question. In the context of the present disclosure, a distracter may also comprise a particular answer/input that is a seemingly plausible, but ultimately incorrect. For example, a correct solution may require a line with a positive slope of 2. A known distracter may comprise a line with a slope of −2. Thus, a student may know that rate of change is a particular value, but is not quite sure if the rate of change is positive or negative. Therefore, the student may be considering +2 and −2 as possible inputs. The choice of −2 may be considered a distracter, whereas a +10 or a −20 are clearly incorrect choices, when the correct answer is +2.

If the data collected at step 230 indicates that the user has selected an incorrect answer that is a known distracter, this information may be useful to a teacher who may, for example, consider that the student is close to grasping a concept. In particular, the data is suggestive of the student being able to arrive close to the correct solution. The student appears to have at least a partial understanding of the subject matter (because the student appeared to at least be able to determine the correct rate of change of 2). Further, data may be collected over many different collaborative learning activities (e.g., a set of tasks in a given sequence of tasks), and if it appears that the student continues to make the same type of mistakes (e.g., inputting incorrect answers that are known distracters regarding the directionality of the rate of change), the teacher may then target this student for additional instruction with respect to the narrow concept of directionality in rate of change.

As mentioned above, the data that is collected at step 230 may also include data that is not necessarily derived directly from the inputs via the input devices. For example, an activity station (e.g., 105 and 106 in FIG. 1) may also include one or more microphones for obtaining audio records of individual students or a group of students. With the ability to obtain and/or record audio information, the method 200 may then derive data on the amount of time one of the users spends talking relative to the other users. In addition, the method 200 may derive further data based upon an analysis of the recorded audio. For example, existing speech recognition and/or natural language understanding tools may be applied to determine not only who is speaking, but whether one student is asking another for help or assistance, whether one student is providing another student with help or assistance, and various other points of data that may be useful to a teach/instructor, a designer of collaborative learning activities, and other interested parties. In one embodiment, such speech recognition and/or natural language understanding tools may be deployed at a collaborative workstation, a coordinating unit/server or a monitoring computer, or other components shown in the exemplary system 100.

Similarly, an activity station (e.g., 105 and 106 in FIG. 1) may also include one or more webcams or similar devices for capturing and/or recording video of one or more of the students in a group. With the ability to record video of the one or more students, the method 200 may then derive numerous additional points of data, such as, the amount of time spent gazing at the shared display or the amount of time the users spend facing one another (e.g., via the use of facial recognition tools).

Additional data that the method 200 may collect at step 230 may comprise information on whether and how closely a correct solution follows the providing of a hint, the number of times a user asks for help, the force with which a student presses his or her input device, or a key or button on the input device, and other such information. For example, as mentioned above, the method 200 may record audio of the interactions between students in a group and thus, may discern when one student is asking another student for help. Accordingly, at step 230 the method 200 may further correlate data that indicates a student asked for help and that a correct solution was input at a time "X" after the student asked for help/assistance. In another embodiment, the method 200 may directly receive a request for help. For example, as part of the first task presented, the students may be given a help or hint option if one or more of the students are having difficulty solving the task. In one embodiment, each of the students may seek individual assistance that is only provided to that particular student. However, in another embodiment, the students may collectively seek help as a group. The requesting of help may comprise one of the students manipulating a pointer on the shared display and clicking, via the student's input device, a help button that is displayed on-screen.

In one embodiment, students may be using input devices that comprise tactile feedback devices. Accordingly, at step 230, the method 200 may additionally record data that is indicative of how hard a student presses or is pressing his or her input device. Data of this nature may be indicative of a probable mood (e.g., tense, relaxed, etc.) of a student. In addition, if similar data is collected over many tasks/collaborative learning activities, the method 200 may derive patterns of mood for a particular student with respect to certain types of activities, or even a whole series of activities. For example, a student may be tense for a whole class session over many different activity types. A teacher given this information may then be motivated to inquire whether he or she failed to provide the student with the proper foundation for the subject matter of the current collaborative learning activities, for instance.

All of the above examples describe particular instances of the types of data that may be collected at step 230. However, the foregoing is presented by way of example only, and not as a limitation. Thus, in numerous other, further and different embodiments, various other types of data and data points may be collected at step 230 which pertain to information that is beyond the mere "correctness" of a set of inputs for a task, or more than simply the fact that a particular combination of inputs was entered that is a correct solution to a task.

At step 240, the method 200 presents an output based on the inferred conclusions about the level of comprehension. For example, the analysis at step 230 may indicate that a group of students has not given a correct solution to the first task within an instructor-selected or a predefined threshold period of time (e.g., 5 minutes, 10 minutes and so on). Thus, in one embodiment, the method 200 may automatically provide a hint to the group of students when the 5 minute mark is passed. In another embodiment, a teacher (e.g., at a monitoring station, such as monitoring station 150) may observe the data collected at step 230 via a display (e.g., monitoring display 151) and determine that a particular student, or group of students is struggling. In such case, the teacher may manually determine to provide feedback to one or more of the students. For example, the method 200 may enable the teacher to display a hint or other comment to the group of students via a shared display for all of the students in the group to view. Alternatively, or in addition, the method 200 may enable the teacher to open a private audio connection between the monitoring station 150 and an output device (e.g., a headset) of a particular student. The method 200 thus enables the teacher to provide private comments or hints to only one of the students in a group. In the same manner, the method 200 also enables the teacher to provide encouragement to a particular student or group of students who are performing well. Likewise, the method 200 also may enable the teacher to privately ask a high performing student to allow the other students in the group a chance to take the lead, or to encourage the high performing student to spend more time explaining and assisting the other students in the group.

In one embodiment, at step 240 the method 200 may select a next task or a sequence of additional tasks based upon the analysis at step 230. For example, the analysis at step 230 may measure a time in which it takes to receive one or more inputs from one or more input devices. If the time in which an input, or a set of inputs from a group are received exceeds a threshold, the method 200 may infer that the students are probably struggling with a particular concept associated with the first task being presented. Accordingly, at step 240 the method 200 may automatically select a next task or a sequence of subsequent tasks directed to the same concept as the first task, or having the same difficulty level as the first task. On the other hand, if the analysis of step 230 indicates that a group of students is presenting inputs via the input devices with only very short delays, the method 200 may determine that the group is progressing quickly and at step 240 may select a next task or a sequence of subsequent task with a greater difficulty level than the first task or a different concept to be taught, as compared to the first task.

Figure 4:
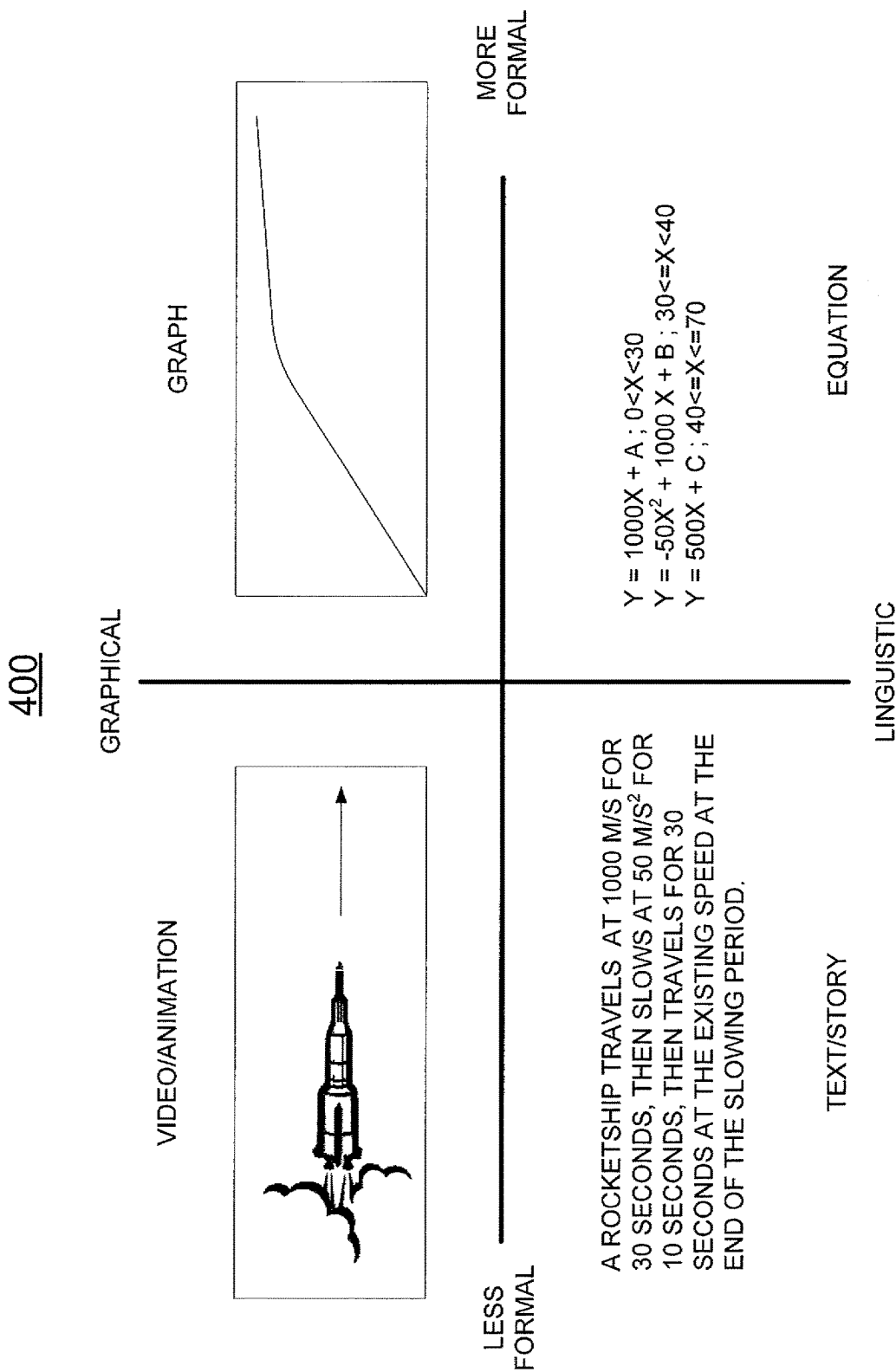
FIG. 4 illustrates a pedagogical framework for the learning of mathematics, according to the present disclosure.

In addition, in one embodiment at step 240, the method 200 may select one or more subsequent tasks that involve "more formal" modalities or "less formal" modalities as compared to the first task. To aid in understanding, FIG. 4 illustrates a common pedagogical framework for the teaching and learning of mathematics. In particular, a single mathematical concept may be represented in less formal modalities (e.g., video/animation or text/story) or more formal modalities (e.g., a graph or an equation), in a more graphical form (e.g., video/animation or graph) or a less graphical form (e.g., text/story or equation). To obtain a full understanding of a mathematical concept, it is helpful to master the same concept in all of the different possible modalities as well as to be able to transcode between the different modalities. Thus, in the case of mathematical learning, for instance, transcoding may involve students receiving a task in a multi-modal form including, for example, an (incomplete) text or a story (a first modality), an (incomplete) video (a second modality), and an (incomplete) equation, graph or animation and solving or completing the task by providing one or more inputs in each modality as required. As such, successful completion of the task requires transcoding from each of the modalities to a different modality.

With respect to the present method 200, at step 230 the method may infer that a particular student or group of students has struggled to transcode between two modalities (e.g., from an animation to a graph). Thus, at step 240, the output selected by the method 200 may comprise presenting a subsequent task that also involves transcoding between an animation and a graph. In other words, the subsequent task will also comprise the presentation of an animation, and the users will again be required to collectively complete a graph.

Similarly, a first task presented at step 210 may comprise the presentation of a video, where the successful completion of the task requires the students to input various portions of a cloze paragraph which describes what is taking place in the video (e.g., the trajectory of a rocket ship). Thus, this particular task centers on two "informal" modalities, as shown in the framework of FIG. 4. If, at step 230, the method infers that the group of students has a mastery of this concept using the more "informal" modalities, the output selected at step 240 may comprise presenting a subsequent task that involves one or more of the more formal modalities (e.g., presenting a text/story and requiring the students to manipulate an equation to represent that which is described in the story, or presenting one or more equations and requiring the students to manipulate a graph corresponding to the equation). In still another embodiment, the output of step 240 may comprise a list that regroups students into different activity groups for a next day, a next subject, etc. For example, the method 200 may redistribute three advanced students who were in a particular group to three different groups, where the more advanced students can then provide assistance to other students who are less advanced, thereby potentially enhancing collaboration with respect to other groups of students.

While the method 200 features the collection of data and presentation of an output that is not solely focused on the "correctness" of the inputs, it should also be noted that at step 240, the method 200 may nevertheless acknowledge the successful completion of the task in various ways. For example, the method 200 may acknowledge successful completion of the task by presenting an indication to the group of students (e.g., via the visual display) that the task is successfully completed. This may be as simple as a text which states "you are correct" or a similar statement. However, the method 200 may also present an animation. For instance, the first task may be presented in a textual modality. Thereafter, when a set of correct inputs is received in a graphical modality, the method 200 may play an animation that matches what is described in the text, as well as what is shown in the corresponding graph. For example, in FIG. 3 box 3, an animation of a rocket ship may correspond to the positions indicated in the graph in box 2, which further corresponds or matches the description of the rocket ship's path/trajectory in box 1. In general, in some embodiments the acknowledgement may comprise a representation of the task in another modality that is different from the modality in which the task is presented and/or the modality in which the inputs are received. This may further reinforce learning and understanding the concept that is the subject of the task, e.g., via the pedagogical framework of FIG. 4. In particular, the greater the number of modalities in which student(s) understand a mathematical concept, along with the ability to transcode between such modalities, leads to a deeper and fuller understanding and also provides a foundation for students to progress to more advanced concepts. In one embodiment, each of the visual representations (e.g., boxes 1, 2 and 3 of FIG. 2) is displayed simultaneously upon the successful completion of the task.

Following step 240, the method 200 proceeds to step 295 where the method ends. However, it should be noted that numerous iterations of the method 200 may in fact be performed (e.g., by or through a collaborative workstation). For example, the method 200 describes an exemplary process involving the presentation of a first task. However, as described above, step 240 may involve the selecting and presenting of one or more subsequent tasks. As such, the method 200 may, in fact, be repeated with respect to one or more of the subsequent tasks presented as an output at step 240.

In addition, although the exemplary method 200 has been described above as primarily taking place at or being performed by a collaborative workstation, it should be understood that any one or more of the steps of the method 200 may be performed by different components depending upon the particular collaborative learning system that is used. For example, the data collected at step 230 may instead be collected by a server or coordinating unit 140. For example, a collaborative workstation may simply pass collected data to a coordinating unit for storage and/or analysis. Thus, while the output of step 240 may ultimately be presented by a collaborative workstation, or a shared display connected to the collaborative workstation, the analysis of the data collected at step 230 and the selection of the output to present at step 240 may instead be performed automatically by the a coordinating unit, a monitoring station, or even manually by a teacher (e.g., via a monitoring station).

Figure 5:
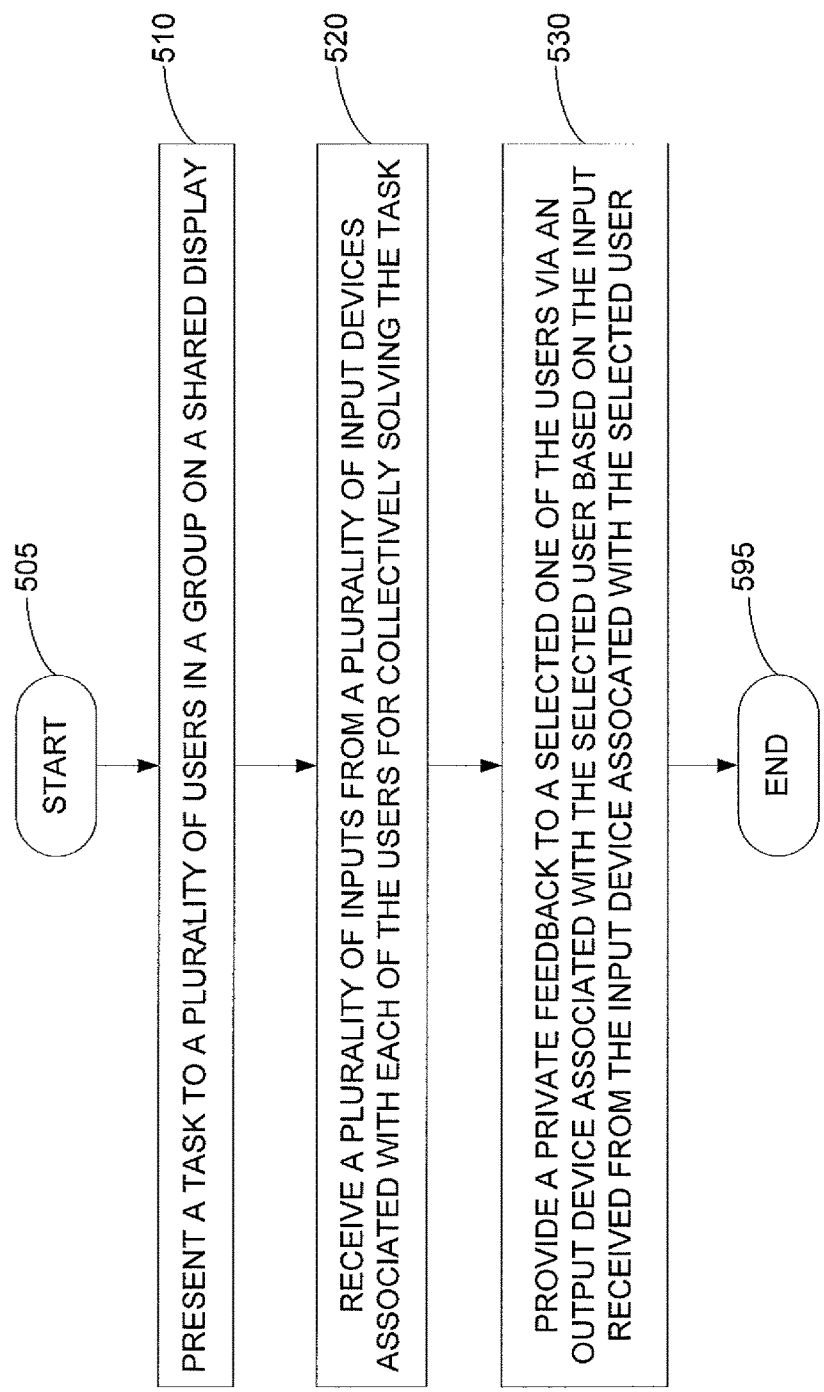
FIG. 5 is a flow diagram illustrating another embodiment of a method for providing collaborative learning, according to the present disclosure.

FIG. 5 illustrates another embodiment of a method for providing collaborative learning. The method 500 may be implemented, for example, by a collaborative workstation (such as either of collaborative workstations 110 or 111 illustrated in FIG. 1), or any other device, or group of devices described above in connection with the method 200 of FIG. 2.

The method 500 is initialized at step 502 and proceeds to step 510, where the method presents a first task to a plurality of users via a shared display. For example, at step 510, the method 500 may present a task to a plurality of users in a group on a shared display in the same manner as described with respect to step 210 of the method 200 above. For instance, the method 500 may receive at least a first task and then present the first task to a group of students on a shared display that is visible to and shared by each of the students at a particular activity station. The task may be presented in any number of modalities such as a text, graph, equation or animation/video. For example, FIG. 3 box 1 shows an example of a task presented in a textual modality.

In step 520, the method 500 receives a plurality of inputs from a plurality of input devices associated with a group of users for collectively solving the first task. For example, as shown in FIG. 3 box 2, the successful completion of the task may require that each of three students/users manipulate the slope, length, placement or other parameters of a single line segment in a graph. Each of the students may have the ability, via an individual input device, such as a touchpad, to control aspects of only one of three available line segments. The successful completion of the task requires that all three line segments be correctly placed and aligned in order to match the text description in box 1. If any one of the three segments is incorrect, the task will not be successfully completed. However, the students in the group may not be told which of the segments are correctly placed, and which are incorrectly placed. Thus, to change the inputs to give a correct solution may require that the three students interact to assist one another in determining whose input is incorrect. While these interactions, or collaborative process between the students take place, the method 500 may display (e.g., continuously) the plurality of inputs received from the plurality of input devices associated with each of the students (e.g., FIG. 3, box 2).

At step 530, the method 500 presents a private feedback to a selected one of the users via an output device associated with the selected user. The output may be based on the input received from the input device associated with the selected user or upon the collective inputs of the group. In one embodiment, the private feedback is selected based upon a probabilistic conclusion inferred from the inputs (and/or data pertaining to the inputs) received at step 520. In one embodiment, the method 500 may determine that a particular student in a group continuously struggles to match his or her input to the inputs of other members in the group. Thus, the method 500 may automatically, or when prompted manually (e.g., by a teacher), provide a private feedback to the particular student that is struggling. The private feedback may include hints, tips or additional instruction. Similarly, the method 500 may determine that a particular student in a group is continuously dominating a series of tasks, is dominating the conversations in a group, is always providing the first input, etc. Accordingly, at step 530, the method 500 may provide a private feedback to the particular student asking the student to allow the others in the group to participate more, asking the student to give others in the group more time to reach their own decisions without assistance from the particular student, requesting that the particular student slow down and provide assistance or explanations to other members in the group, or even providing encouragement to the student. For example, at step 530, the method 500 may open a private feedback communication channel between an instructor and a particular student, allowing the instructor to say to the student, "You seem to be doing well today and really understand the material. I bet you put a good effort into your homework last night. Good job," as an example.

As described above in connection with the collaborative learning system 100 of FIG. 1, some embodiments may include personal output devices (e.g., 131-133 and 135-137) for each of the users/students in each of the collaborative learning groups in a classroom. In one embodiment, each of the output devices comprises a headset. For example, a teacher may, via a microphone at a monitoring station, speak directly to a particular student through a connection to the student's headset. In another embodiment, each of the output devices comprises an audio speaker, an individual display (e.g., on a personal device, such as a cell phone, 802.11 wireless device, laptop computer, and the like), or other such means for contacting an individual user, without alerting or notifying other students in the same group. For example, the method 500 may enable a teacher to send an email, a text message, an instant message (e.g., a SMS message), and the like to an output device of the student, such that the other students in the group and in the class do not see the private feedback. In one embodiment, each of the output devices may be integrated with an associated input device. For example, an input device used to provide an input received at step 520 and the output device used to provide a private feedback may in fact be one single tablet computer and/or one single tactile feedback device.

It should be noted that a tactile feedback device, or haptic touch device, may comprise a device that changes three-dimensional form, in the nature of a bas-relief, depending upon the circumstances. For example, a task may require a user to slide a runner to a particular location on a one dimensional graph where the axis measures a distance. For instance, the task may require the user to place a runner at a location where the runner will be in 8 seconds, and where the runner is running at a rate of 2 meters per second. The tactile feedback device may create a shallow channel, as well as tick marks, much like on a ruler, corresponding to every one meter or 0.5 meters. The user may slide a finger to an appropriate location on the tactile feedback device and a runner depicted on a graph on a screen may move to a corresponding position. As the user drags a finger further and further away from the correct position, the tactile feedback device may provide physical feedback to the user. For example, the channel or trench created for the user to slide a finger may be modified to become steeper and steeper in a direction in which the user is moving his or her finger, thereby making it harder and harder to continue in that direction. This signals to the user that he or she should probably backtrack.

In one embodiment, private feedback may be provided automatically at step 530 (e.g., according to instructions or computer codes accompanying a particular task, or task list). For example, if a user has not provided a correct input within a threshold amount of time for a particular task, the method 530 may automatically provide a first hint via private feedback to the user according to such instructions. If the user has not provided a correct input within a second threshold amount of time for a particular task, the method 530 may provide a second hint via private feedback, and so forth. For instance, a second (tactile) private feedback may include providing a resistance in the other direction along the axes, thereby hinting to the user that the correct input lies somewhere in a particular range. Additional private feedback may further constrain the range of possible inputs.

In another embodiment, private feedback is provided by the method 500 at step 530 upon receiving a manual instruction. For instance, an instructor, via a monitoring computer, may select one or more feedback options to present to a particular user's output device, depending upon the data observed by the instructor. For example, the method 500 may present to the instructor various points of data collected from various activity groups, particular students' input devices, and the like. For example, the instructor may be able to view a list showing the number of incorrect inputs attempted by a student or a group of students in a collaborative activity group. Based upon various observations of this nature, the teacher may then choose to provide various types of private feedback, including preconfigured tactile feedback, to one or more students. It should be noted that the foregoing is just a few examples of the types of possible private feedback that may be provided through output devices such as individual headsets, tablets, tactile feedback devices, and the like. Thus, in other, further and different embodiments, various other types of private feedback are possible, depending upon the nature of the particular task presented at step 510 and the particular type(s) of output devices available to communicate with individual students.

Following step 530, the method 500 proceeds to step 595 where the method ends. However, it should be noted that numerous iterations of the method 500 may in fact be performed (e.g., by a collaborative workstation). For example, the method 500 describes an exemplary process involving the presentation of a first task. However, as described above, step 530 may involve presenting private feedback to one or more students in a group, where the group may or may not have successfully completed a task. As such, the method 500 may, in fact, be repeated with respect to the same task, or one or more of subsequent tasks as students in various groups in a classroom progress through a particular task or a sequence of tasks.

Figure 6:
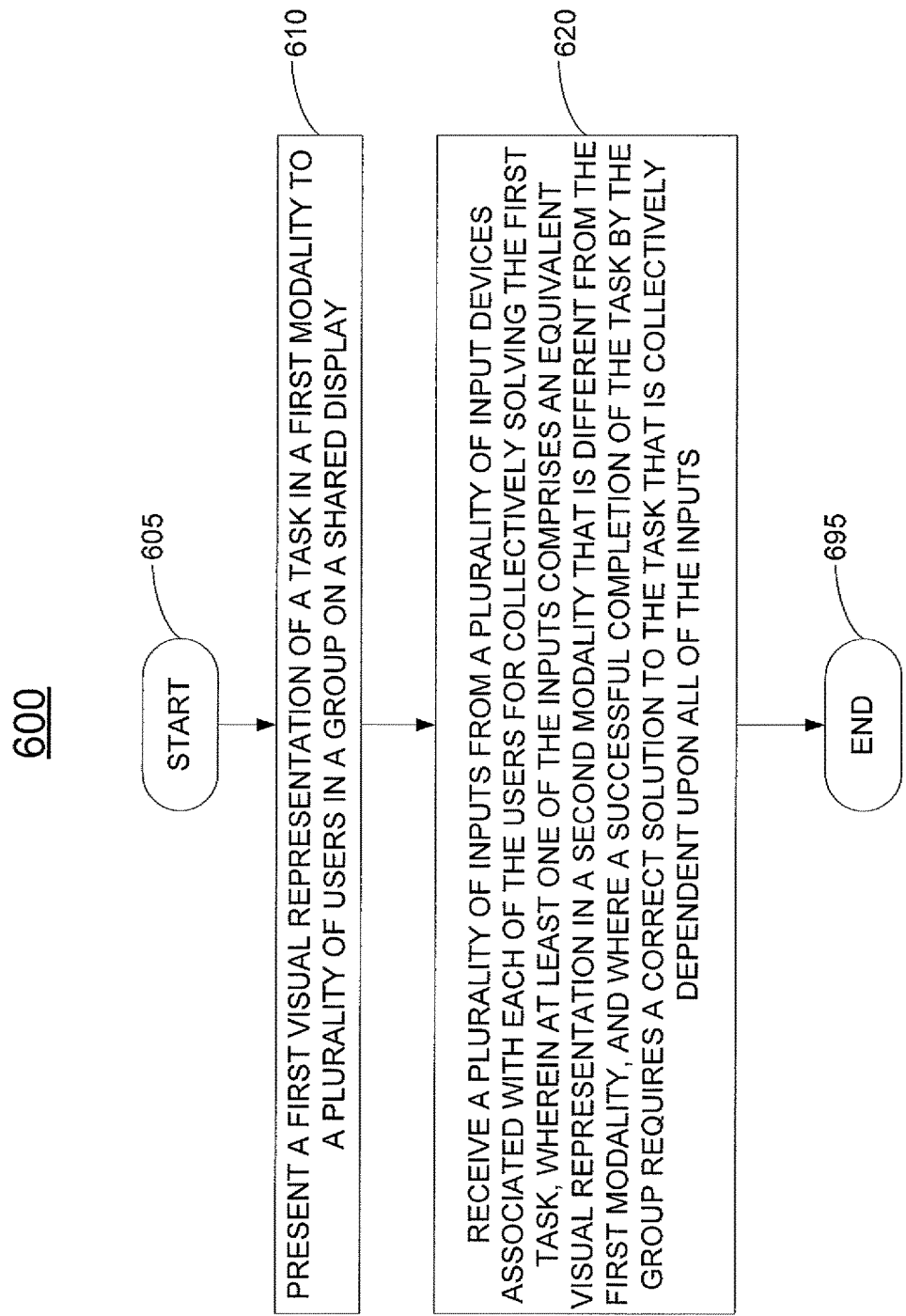
FIG. 6 is a flow diagram illustrating still another embodiment of a method for providing collaborative learning, according to the present disclosure.

FIG. 6 illustrates still another embodiment of a method for providing collaborative learning. The method 600 may be implemented, for example, by a collaborative workstation (such as either of collaborative workstations 110 or 111 illustrated in FIG. 1), or any other device or group of devices as described above in connection with either or both of the methods 200 and 500.

The method 600 is initialized at step 602 and proceeds to step 610, where the method presents a first task to a plurality of users via a shared display. For example, at step, 610, the method 600 may present a first visual representation of a task to a plurality of users in a group on a shared display in the same manner as described above with respect to step 210 of the method 200 or with respect to step 510 of the method 500. For instance, the method 600 may receive at least a first task and present the first task to a group of users on a shared display. As with the previous methods 200 and 500, the task may be presented in any number of modalities such as a text, graph, equation or animation/video. For example, FIG. 3 box 1 shows an example of a task presented in a textual modality.

In step 620, the method 600 receives a plurality of inputs from a plurality of input devices associated with each of the users for collectively solving the first task. Notably, the task is arranged such that at least one of the inputs comprises an equivalent visual representation of the task in a second modality that is different from the first modality. In addition, a successful completion of the task by the group of users requires a correct solution to the task that is collectively dependent upon all of the inputs. For example, as shown in FIG. 3 box 2, the successful completion of the task may require that three users each manipulate the slope, length, placement or other parameters of line segments in a graph. In the example shown in FIG. 3, and in various other embodiments, the modality of the inputs (e.g., a graph) is different from the modality in which the task is presented. This requires students to conceptualize across and between different modalities, or to "transcode," as described above.

Returning to the example task as shown in FIG. 3, a correct solution requires the correct placement and alignment of three line segments representing the three different time periods described in the text. Each of the students may have the ability, via an individual input device, such as a touchpad, to control aspects of only one of three available line segments. The successful completion of the task requires that all three line segments be correctly placed and aligned in order to match the text description in box 1. If any one of the three segments is incorrect, or is not compatible with the other segments, the task will not be successfully completed. However, the students in the group may not be told which of the segments are correctly placed, and which are incorrectly placed. Thus, to change the inputs to give a correct solution may require that the three students interact to assist one another in determining whose input is incorrect, or whose should be changed in order to make the inputs compatible with one another to provide a collectively correct solution. While these interactions, or collaborative process between the students take place, the inputs received from the plurality of input devices associated with each of the students/users (e.g., FIG. 3, box 2) may be displayed on a shared display device.

Following step 620, the method proceeds to step 695, where the method ends. However, it should be noted that numerous iteration of the method 600 may in fact be performed (e.g., by a collaborative workstation). For example, the method 600 describes an exemplary process involving the presentation of a first task. However, steps of the method 600 may be performed as a part of, or in conjunction with any one or more of the steps of the methods 200 and/or 500. As such, the method 600 may, in fact, be repeated with respect to the same task, or one or more subsequent tasks.

Figure 7:
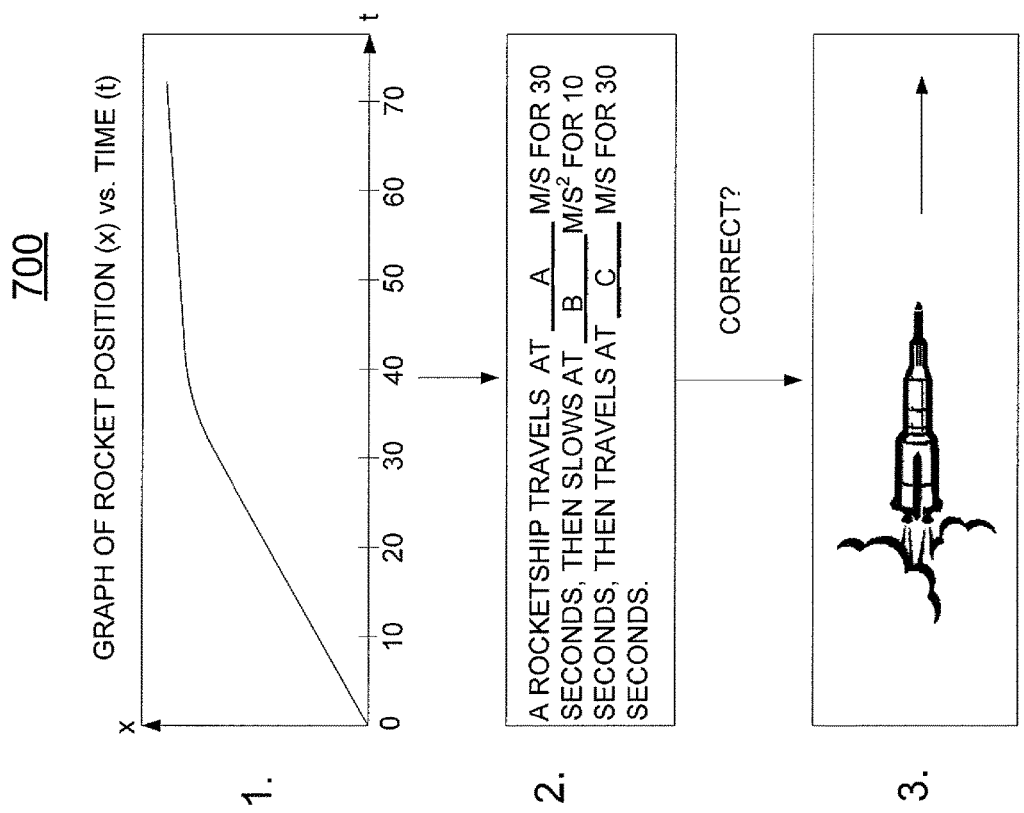
FIG. 7 illustrates another exemplary collaborative learning activity, according to the present disclosure.

FIG. 7 shows another exemplary collaborative learning activity, or task, according to the present disclosure. In particular, the above embodiments (such as methods 200, 500 and 600) have been described in connection with an exemplary task/collaborative learning activity as represented in FIG. 3. However, the particular embodiment of FIG. 3 is referenced in connection with each of the exemplary methods for illustrative purposes only. As such, embodiments of the present disclosure are generally applicable to numerous other collaborative learning activities, or tasks. Thus, FIG. 7 presents an additional collaborative learning activity 700 as one further example.

More specifically, collaborative learning activity 700 may present a task in the form of a graph (box 1) that shows the position of a rocket ship with respect to time. The task may further ask the students to transcode the graphical representation of the task into a textual form, e.g., by performing a collaborative cloze sentence (box 2). For example, the first student may control an input for blank A, the second student may control an input for blank B, and a third student may control an input for blank C. A successful completion of the task requires that the sentence correctly conform to the graph shown in box 1. If any one of the inputs is incorrect, the students may be informed (e.g., via a buzzer sound, a red light or text popup, or other form of notification) that a correct solution has not been received. However, the students will not necessarily be told which of the inputs should be changed. Thus, the students may need to discuss with each other and collaborate in order to modify one or more of the inputs to reach the correct solution. If the students eventually provide a set of inputs that correctly corresponds to the graph, the collaborative learning activity 700 may call for the display of an animation (box 3) that corresponds to the graph shown in box 1, as well as the correct solution of box 2. Notably, the collaborative learning activity 700 is suitable for use in conjunction with the exemplary system 100 and any one or more of the exemplary methods 200, 500 and 600 discussed above.

In another embodiment similar to that shown in FIG. 7, a collaborative learning activity may comprise a text-based description of the movement of an object (e.g., a rocket ship). The successful completion of the task may require the students to perform a "video cloze" exercise. In particular, a "video close" may comprise an activity that is similar to a tradition doze paragraph activity, in which students fill in the blanks in a text passage, but instead in which the students fill in particular missing portions of a video. For instance, a 30 second video may have three 5-second clips that are omitted. Each of the students may be presented with a choice of several possible 5-second clips to insert in the respective blanks in the video. The goal is to select the correct clips to insert in order to produce a final video that makes sense and accurately depicts an original text description of the movement of the object as given as step 210 (or a graph, equation or other modality in which a task is first presented).

Figure 8:
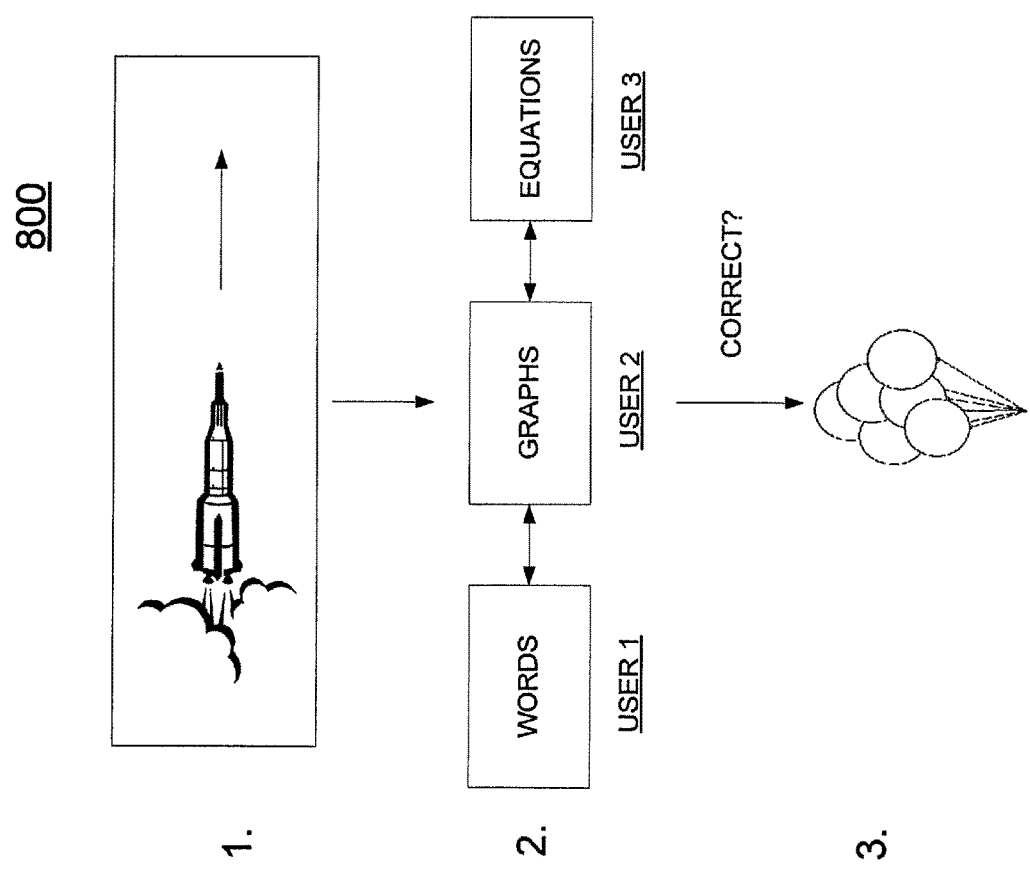
FIG. 8 illustrates still another exemplary collaborative learning activity, according to the present disclosure.

FIG. 8 shows yet another exemplary collaborative learning activity 800, or task, according to the present disclosure. More specifically, collaborative learning activity 800 may present a task (see box 1) in the form, or modality of a video/animation that shows the movement of an object (a rocket ship). A successful completion of the task may require that each of three students correctly transcode the video/animation task into a different modality (e.g., by transcoding the events shown in the animation into a correctly corresponding story, a graph which correctly represents the position, velocity or other parameters of the animation, or an equation which represents the trajectory of the object. In the embodiment of collaborative learning activity 800, student/user 1 may be required to complete a doze sentence, filling in one or more blanks to create a sentence or paragraph that accurately describes the movement of the object shown in the animation/video. Student/user 2 may be required to manipulate one or more line segments, plot points, etc. to create a graph which accurately represents the movement of the object as shown in the animation/video of box 1. Finally, student/user 3 may be required to manipulate one or more variables to create an equation which correctly corresponds to the motion of the object. Thus, each of the students may be required to perform a different type of transcoding (e.g., transcoding into different modalities). However, if any one or more of the inputs is incorrect, the group of students may be notified that a collective set of correct inputs has not yet been received. Thus, the students in the group may need to discuss with each other, consider the inputs provided by their peers in the other modalities, debate or discuss with one another which input(s) are believed to be incorrect and why, and so on. In any case, if and when the group of students provides a collectively correct set of inputs, the group may be notified that task is successfully completed. For example, a bell or clapping sound may be played, a reward animation may be displayed on a shared display or an additional representation of the task in another modality may be presented. Notably, the collaborative learning activity 800 is suitable for use in conjunction with the exemplary system 100 and any one or more of the exemplary methods 200, 500 and 600 discussed above.

Figure 11:
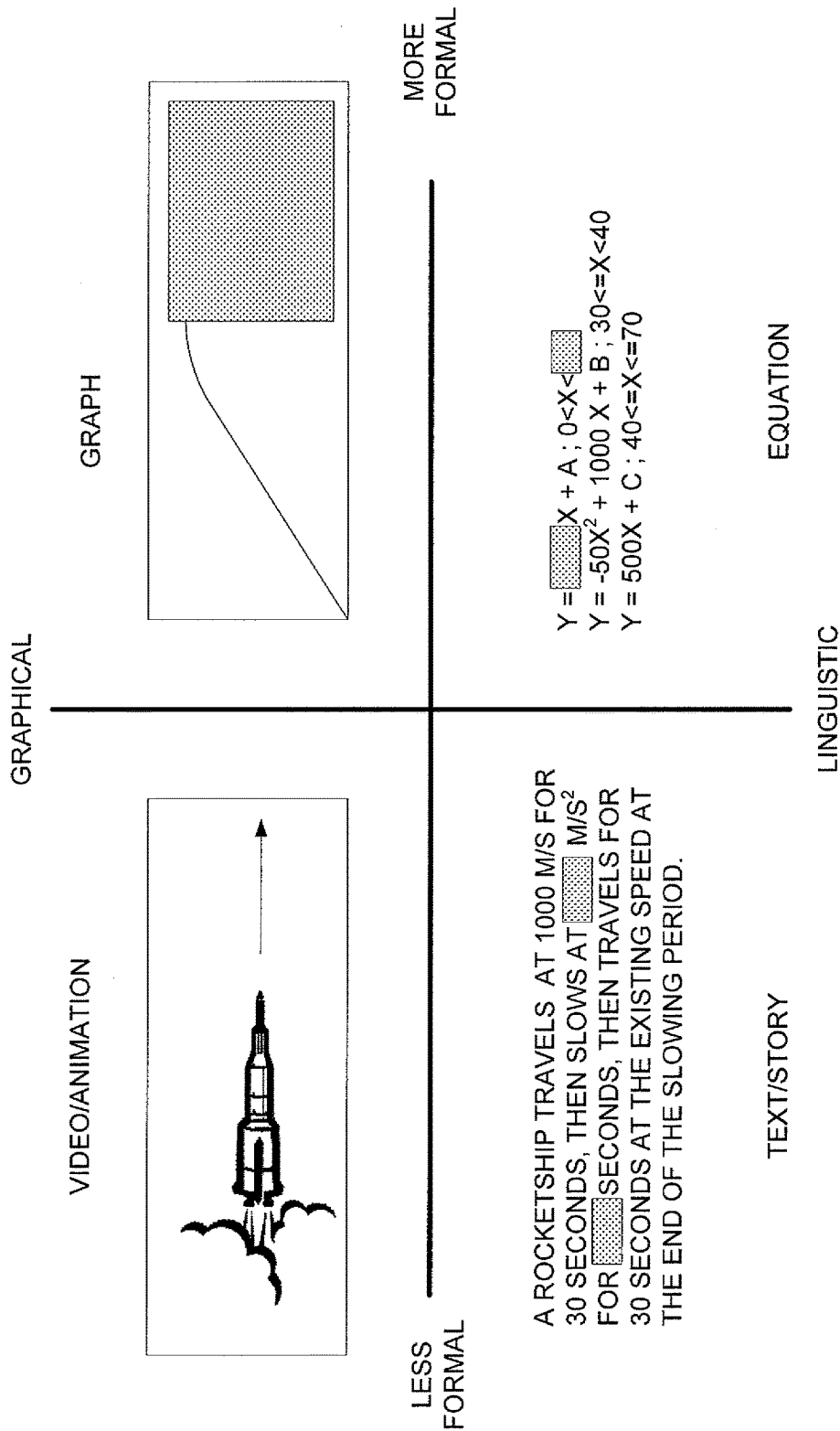
FIG. 11 illustrates yet another exemplary collaborative learning activity, according to the present disclosure.

FIG. 11 shows yet another exemplary collaborative learning activity 800, or task, according to the present disclosure. In particular, FIG. 11 illustrates a collaborative learning activity where each transcoding source for each of the users is part of, or based upon another user's completed response. For example, as shown in FIG. 11, the task is presented in three modalities (here graph, equation, and story) and a fourth modality (here video) which is reserved as a "reward". Each user controls aspects of one of the modalities (e.g., as shown by the hashed boxes in each of the text/story, equation and graph portions of the figure) and must transcode from the modalities of other users to determine correct responses. When all of the responses have been correctly entered, the fourth modality is activated and shown completed.

In one embodiment, a collaborative task, such as shown in FIG. 11, is crafted with the property that each user's choices can preclude others from choosing correctly starts from a collection of completed representations with equivalent logical form. For example, these could be true statements of the form "[A] since [B] and [B'] but not [C]". From this collection, lists may be produced of the choices for each variable part. Sufficiently many options are removed from the lists so that some choice in each list has at least one missing partner from another list. The final lists may then be used as possible inputs in the various hashed boxes shown in FIG. 11. For example, each box in each of the text/story, equation and graph portions of the figure may present a tumbler that offers a list of possible inputs for the box (the list being created as per the above). The user can then select one from among the several choices. In one embodiment, to facilitate interdependence among the users and their responses, it may be desirable that the input choices for one or more of the users can preclude one or more of the other users from responding correctly, or constrain what constitutes a correct response by other users. Notably, the collaborative learning activity 1100 is suitable for use in conjunction with the exemplary system 100 and any one or more of the exemplary methods 200, 500 and 600 discussed above. Again, it should be noted that other different collaborative learning activities/tasks may be created and used in connection with embodiments of the present disclosure. Thus, FIGS. 3, 7, 8 and 11 are merely examples of the numerous collaborative learning activities in accordance with the present disclosure.

FIG. 9 is a high level block diagram of a general purpose computing device 900 that can be used to implement embodiments of the present disclosure for providing collaborative learning activities, as described above. It should be understood that embodiments of the disclosure can be implemented as a physical device or subsystem that is coupled to a processor through a communication channel. Therefore, in one embodiment, a general purpose computing device 900 comprises a processor 902, a memory 904, a collaborative learning activities module 905, and various input/output (I/O) devices 906 such as a display, a keyboard, a mouse, a modem, a receiver, a transmitter, and the like. In one embodiment, at least one I/O device is a storage device (e.g., a disk drive, an optical disk drive, a floppy disk drive).

Alternatively, embodiments of the present disclosure (e.g., one of the methods for providing collaborative learning activities, embodied in module 905) can be represented by one or more software applications (or even a combination of software and hardware, e.g., using Application Specific Integrated Circuits (ASIC)), where the software application is loaded from a storage medium (e.g., I/O devices 906) and operated by the processor 902 in the memory 904 of the general purpose computing device 900. Thus, in one embodiment, the collaborative learning activity module 905 for providing collaborative learning activities described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present disclosure have been shown and described in detail herein, those skilled in the art can readily devise many other varied embodiments that still incorporate these teachings.

What is claimed is:

1. A computer-implemented method for selecting tasks for presentation to users, the method comprising:
    presenting a first task to a plurality of users on a shared display;
    receiving a plurality of inputs from a corresponding plurality of user devices for collectively solving the first task,
    wherein the shared display includes independently-changeable elements for manipulation on the shared display according to respective inputs from the corresponding plurality of user devices,
    wherein each of the user devices is associated with a different one of the users, the received inputs indicating information in addition to whether the first task is solved;
    analyzing the received inputs to determine whether the first task is solved;
    computing one or more probabilistic conclusions about a level of comprehension associated with the first task, each probabilistic conclusion being a conclusion based upon collected data that is more or less likely to be true based on a value of the collected data, wherein the one or more probabilistic conclusions are computed at least in part from the received inputs, wherein the one or more probabilistic conclusions are computed at least in part on a manner in which the inputs are received, the manner being indicative of manipulation on the shared display of the independently-changeable elements by the users that indicates the level of comprehension associated with the first task, and wherein the one or more probabilistic conclusions are computed at least in part from comparing the indicated information of the received inputs to a threshold to determine if the level of comprehension is average, above average, or below average; and
    presenting a private feedback to a user in the plurality of users through the user device associated with the user, wherein the private feedback corresponds to the computed probabilistic conclusions, differs from feedback provided to others in the plurality of users, and comprises information other than whether the first task was correctly solved; and
    selecting, based at least on the one or more computed probabilistic conclusions, a subsequent sequence of one or more tasks and presenting the subsequent sequence of one or more tasks to the users on the shared display.

2. The method of claim 1, wherein the one or more computed probabilistic conclusions include one or more conclusions regarding a level of collaboration among the users.

3. The method of claim 1, wherein the one or more computed probabilistic conclusions comprise one or more inferences that at least one of the users has provided assistance to at least another of the users.

4. The method of claim 1, further comprising:
    tracking a progression of the plurality of users as a group over a plurality of tasks.

5. The method of claim 1, wherein the first task comprises an educational task.

6. The method of claim 1, wherein the subsequent sequence of one or more tasks comprises:
    a more difficult task than the first task;
    a less difficult task than the first task;
    a task having a same difficulty level as the first task; or
    a more formal task that the first task.

7. The method of claim 1, further comprising:
    Providing a level of feedback in the subsequent sequence of one or more tasks based upon the one or more computed probabilistic conclusions about the level of comprehension.

8. The method of claim 1, wherein the one or more computed probabilistic conclusions include one or more types of errors, comprising:
    a reactive error;
    a time of day error;
    an ordering error; or
    an error in response to a known distracter.

9. The method of claim 1, wherein the collected data comprises at least one of:
    a speed of receiving one of the plurality of inputs after presenting the first task to the shared display;
    an order of receiving the plurality of inputs from the plurality of user devices after presenting the first task to the shared display;
    a measurement of the time the plurality of users collectively spends on the first task; or
    a number of attempts to complete the first task.

10. The method of claim 1, wherein the collected data comprises a recorded amount of force as applied to one of the plurality of user devices.

11. The method of claim 1, wherein the one or more computed probabilistic conclusions comprise:
    a correlation between a level of performance and a time of day in which the first task is presented.

12. The method of claim 1, wherein the one or more computed probabilistic conclusions comprise:
    a mood of one of the plurality of users.

13. The method of claim 1, wherein the private feedback is presented via at least one of:
    a headset;
    a personal display;
    a tactile feedback device;
    an email;
    a text message;
    or a voicemail.

14. The method of claim 1, wherein the private feedback is responsive to at least one of:
    a request for help by the selected user; or
    a performance-related assessment of the selected user.

15. The method of claim 1, further comprising presenting an output based on the one or more probabilistic conclusions about the level of comprehension.

16. The method of claim 15, wherein the output comprises:
    presenting additional feedback on the shared display to the plurality of users; or
    presenting the subsequent sequence of one or more tasks.

17. The method of claim 15, wherein presenting an output comprises presenting an output to one of the plurality of the user devices.

18. A system comprising:
    a server;
    a shared display; and
    a plurality of user devices,
    wherein the server is configured to present a first task to a plurality of users on the shared display,
    wherein the server is configured to receive a plurality of inputs from a corresponding plurality of user devices for collectively solving the first task,
    wherein the shared display includes independently-changeable elements for manipulation on the shared display according to respective inputs from the corresponding plurality of user devices,
    wherein each of the user devices is associated with a different one of the users, the received inputs indicating information in addition to whether the first task is solved,
    wherein the server is configured to analyze the received inputs to determine whether the first task is solved;
    wherein the server is configured to compute one or more probabilistic conclusions about a level of comprehension associated with the first task, each probabilistic conclusion being a conclusion based upon collected data that is more or less likely to be true based on a value of the collected data, wherein the one or more probabilistic conclusions are computed at least in part from the received inputs, wherein the one or more probabilistic conclusions are computed at least in part on a manner in which the inputs are received, the manner being indicative of manipulation on the shared display of the independently-changeable elements by the users that indicates the level of comprehension associated with the first task, and wherein the one or more probabilistic conclusions are computed at least in part from comparing the indicated information of the received inputs to a threshold to determine if the level of comprehension is average, above average, or below average,
    wherein the server is configured to present a private feedback to a user in the plurality of users through the user device associated with the user, wherein the private feedback corresponds to the computed probabilistic conclusions, differs from feedback provided to others in the plurality of users, and comprises information other than whether the first task was correctly solved, and
    wherein the server is configured to select, based at least on the one or more computed probabilistic conclusions, a subsequent sequence of one or more tasks and to present the subsequent sequence of one or more tasks to the users on the shared display.

* * * * *